(12) United States Patent
Wisniewski

(10) Patent No.: US 7,946,091 B1
(45) Date of Patent: May 24, 2011

(54) POST CONSTRUCTION WALL MOUNTING BOX

(75) Inventor: Stan Wisniewski, Pompton Plains, NJ (US)

(73) Assignee: Crestron Electronics Inc, Rockleigh, NJ (US)

( * ) Notice: Subject to any disclaimer, the term of this patent is extended or adjusted under 35 U.S.C. 154(b) by 227 days.

(21) Appl. No.: 12/426,770

(22) Filed: Apr. 20, 2009

(51) Int. Cl.
*E04B 1/00* (2006.01)

(52) U.S. Cl. ............ 52/741.1; 174/58; 174/53; 220/3.5; 220/3.9; 220/3.94

(58) Field of Classification Search .................. 52/741.1; 174/50, 53, 57, 58, 17 R, 480, 481, 559; 220/3.3, 220/3.5, 3.6, 3.8, 3.9, 3.92, 3.94, 4.02
See application file for complete search history.

(56) References Cited

U.S. PATENT DOCUMENTS

| | | | |
|---|---|---|---|
| 3,362,667 A * | 1/1968 | Ginsburg ..................... 248/27.1 |
| 3,468,448 A * | 9/1969 | Borucki et al. ................. 220/3.6 |
| 4,612,603 A * | 9/1986 | Cook ............................ 361/809 |
| 4,753,361 A * | 6/1988 | Medlin, Jr. ..................... 220/3.6 |
| 4,847,444 A * | 7/1989 | Holland ........................... 174/58 |
| 4,898,357 A | 2/1990 | Jorgensen |
| 5,031,789 A | 7/1991 | Dauberger |
| 5,326,060 A * | 7/1994 | Chubb et al. ................ 248/231.9 |
| 5,598,670 A * | 2/1997 | Humphrey et al. ........... 52/220.8 |
| 6,310,287 B1 * | 10/2001 | Schiedegger et al. ........... 174/50 |
| 6,359,220 B2 * | 3/2002 | Schiedegger et al. ........... 174/50 |
| 6,376,770 B1 * | 4/2002 | Hyde ............................... 174/58 |
| 6,806,425 B1 * | 10/2004 | O'Neill ........................... 174/66 |
| 6,825,414 B2 * | 11/2004 | Vagedes .......................... 174/58 |
| 7,214,877 B2 | 5/2007 | de la Borbolla |
| 7,408,112 B1 * | 8/2008 | Wimberly ....................... 174/66 |
| 7,476,807 B1 | 1/2009 | Gretz |
| 2003/0014939 A1 * | 1/2003 | DeWall ......................... 52/741.1 |
| 2006/0185882 A1 * | 8/2006 | Kurtin ............................. 174/58 |
| 2009/0057303 A1 * | 3/2009 | Oddsen et al. .................. 220/3.5 |

* cited by examiner

*Primary Examiner* — Brian E Glessner
*Assistant Examiner* — Adriana Figueroa

(57) ABSTRACT

A post construction wall mounting box assembly (100) is formed from an enclosure (200) and a clenching bracket (300) which are joined together with joining screws (431, 432) where the enclosure includes a first set of parallel and opposed sidewalls (210) having exterior wall flanges (214) and the clenching bracket includes first and second slideable sidewall portions (310, 320) that have interior wall flanges (314, 324) and these exterior and interior wall flanges cooperate to engage an edge of a wall board when the joining screws are tightened.

11 Claims, 3 Drawing Sheets

POST CONSTRUCTION WALL MOUNTING BOX

BACKGROUND OF THE INVENTION

1. Technical Field

The present invention relates to an apparatus and method for mounting equipment to standard residential wall board and more specifically to a wall box that can be installed after primary construction has been completed.

2. Background Art

In the field of residential construction, and more particularly household electrical wiring, it is well-known to provide mounted electrical enclosures for such things as electrical outlets and wall switches. However, these enclosures are mounted with the expectation that they need to fully comply with requirements associated with high voltages, such as US household voltage of 115 volts, alternating current (115 VAC).

It is known to provide low voltage connections, such as telephone, cable, or Ethernet outlets by attaching these outlets directly to wallboard or providing an enclosure behind such wallboard, where such an enclosure is attached to a wall stud in a manner similar to high voltage applications.

There is a long-felt need for a low-voltage wall enclosure that can be both readily installed and easily removable and reused.

SUMMARY OF THE INVENTION

It is to be understood that both the general and detailed descriptions that follow are exemplary and explanatory only and are not restrictive of the invention.

DISCLOSURE OF INVENTION

In accordance with my invention, a post construction wall box is installed by tightening two joining screws so that cooperating flanges engage edge of the wall board. Advantageously, this is a relatively easy method of installing such a wall box.

According to a first aspect, the present invention provides a post construction wall box adapted to cooperatively engage an edge of a wall board. The wall box comprises an enclosure, a clenching bracket, and first and second joining screws. The enclosure includes a first set of parallel and opposed sidewalls having exterior wall flanges, a second set of parallel and opposed sidewalls having alignment cutouts, and a back wall. The clenching bracket includes a first slideable sidewall portion terminating in a first interior wall flange adapted to engage a first one of said alignment cutouts, a second slideable sidewall portion terminating in a second interior wall flange adapted to engage a second one of said alignment cutouts, and a back wall portion which includes a first threaded hole and a second threaded hole. The first and second joining screws engage the first and second threaded holes, and the exterior wall flange and the interior wall flange cooperatively engage the edge of the wall board when the first and second joining screws are tightened.

According to a second aspect, the present invention provides a post construction wall box adapted to cooperatively engage an edge of a wall board. The wall box comprises a generally rectangular enclosure, a clenching bracket fabricated from steel sheet metal, and first and second joining screws. The enclosure includes a first set of parallel and opposed sidewalls having exterior wall flanges, a second set of parallel and opposed sidewalls having alignment cutouts, and a back wall that includes a utility cutout. The clenching bracket includes a first slideable sidewall portion terminating in a first interior wall flange adapted to engage a first one of said alignment cutouts, a second slideable sidewall portion terminating in a second interior wall flange adapted to engage a second one of said alignment cutouts, and a back wall portion which includes a first threaded hole, second threaded hole, and an associated utility cutout. The first and second joining screws engage the first and second threaded holes, and the exterior wall flange and the interior wall flange cooperatively engage the edge of the wall board when the first and second joining screws are tightened.

According to a third aspect, the present invention provides a method for installing a residential low-voltage wall box into an opening in a wall without requiring additional wall construction. This method comprises the steps of: (a) inserting a clenching bracket into the opening, where this clenching bracket includes a first slideable sidewall portion terminating in a first interior wall flange and a second slideable sidewall portion terminating in a second interior wall flange; (b) compressing the first and second interior wall flanges such that they pass through the opening; (c) expanding the first and second interior wall flanges such that they engage an interior surface of the wall; (d) inserting an enclosure into the opening, where this enclosure includes a first set of parallel and opposed sidewalls that further include exterior wall flanges which are adapted to engage an exterior surface of the wall; and (e) joining the clenching bracket with the enclosure to cause the exterior wall flange and the interior wall flange to cooperatively engage an edge of the wall.

The present invention seeks to overcome or at least ameliorate one or more of several problems, including but not limited to: readily installing low voltage electrical wall boxes as post construction add-ons.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
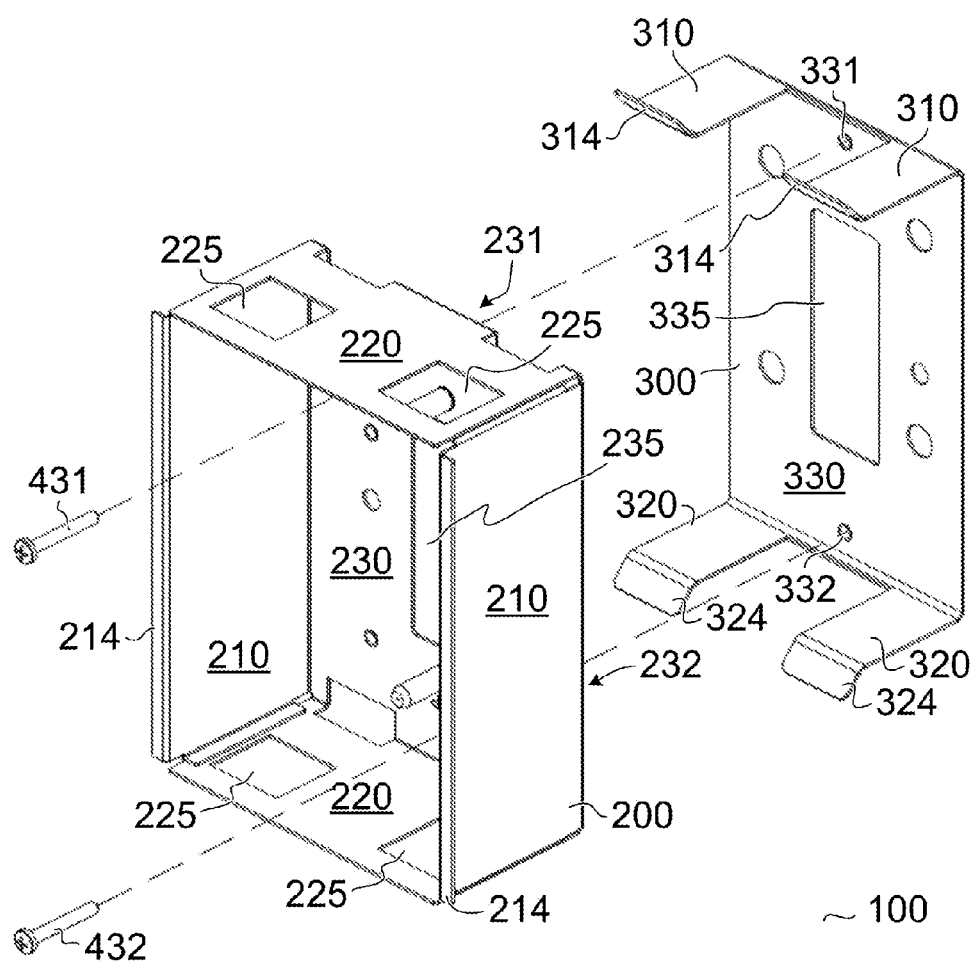

FIG. 1 shows an exploded, or unassembled, view of a post construction in accordance with one illustrative embodiment of my invention.

Figure 2:
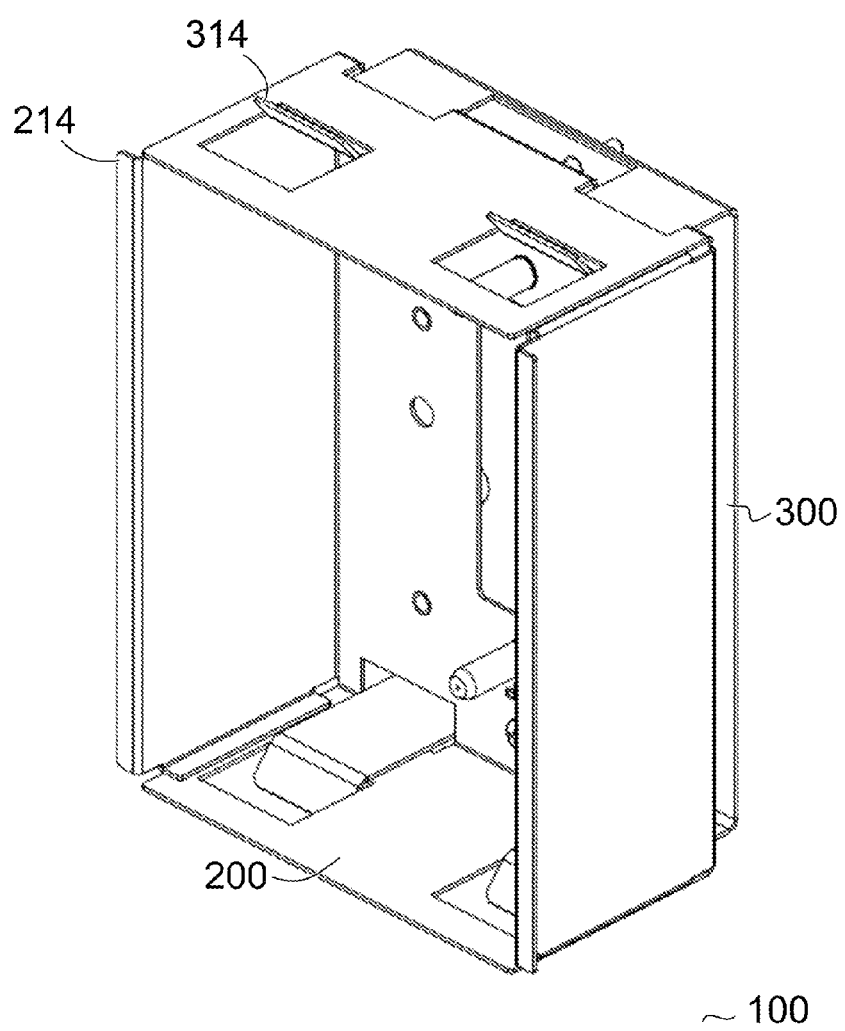

FIG. 2 shows the post construction wall box of FIG. 1 in an assembled configuration.

Figure 3:
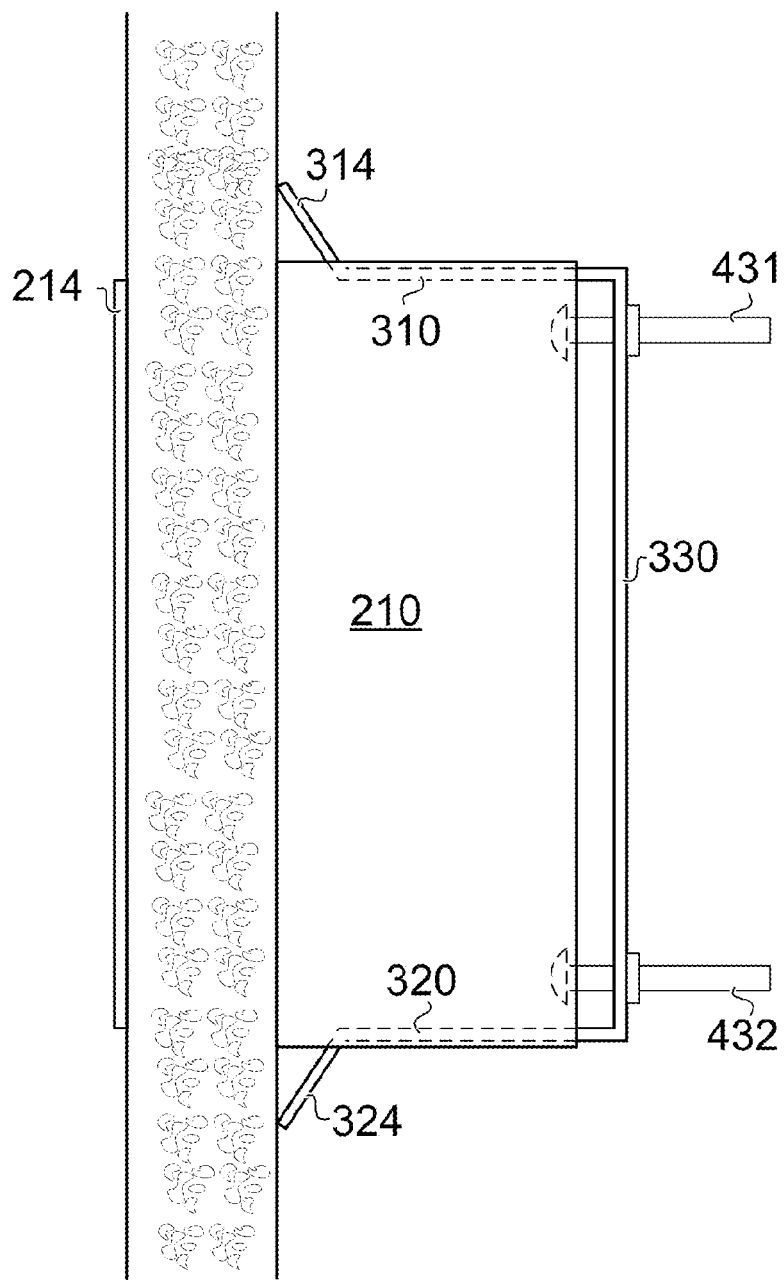

FIG. 3 shows the relationship between the residential low-voltage wall box mounting assembly and the wall showing the mounting assembly inserted into the opening with the exterior wall flanges and the interior wall flanges engaging an edge of the wall.

LIST OF REFERENCE NUMBERS FOR THE MAJOR ELEMENTS IN THE DRAWING

The following is a list of the major elements in the drawings in numerical order.

| | |
|---|---|
| 100 | wall mounting box assembly |
| 200 | enclosure |
| 210 | first set of parallel and opposed sidewalls |
| 214 | exterior wall flanges |
| 220 | second set of parallel and opposed sidewalls |
| 225 | alignment cutouts |
| 230 | back wall (part of enclosure 200) |
| 231 | first hole (through back wall 230) |
| 232 | second hole (through back wall 230) |
| 235 | utility cutout (through back wall 230) |
| 300 | clenching bracket |
| 310 | first slideable sidewall portion (part of clenching bracket 300) |
| 314 | first interior wall flange (part of first slideable sidewall portion 310) |
| 320 | second slideable sidewall portion (part of clenching bracket 300) |
| 324 | second interior wall flange (part of second slideable sidewall portion 320) |
| 330 | back wall portion (part of clenching bracket 300) |
| 331 | first threaded hole (through back wall portion 330) |
| 332 | second threaded hole (through back wall portion 330) |
| 335 | associated utility cutout (through back wall portion 330) |
| 431 | first joining screw |
| 432 | second joining screw |

DETAILED DESCRIPTION OF THE INVENTION

The present invention is generally implemented as part of a low voltage electrical residential installation where a light duty wall box is required, where there is no straight forward access to a wall stud for mounting the wall box.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

The preferred embodiment of the present invention is described herein in the context of a low voltage electrical residential installation, but is not limited thereto, except as may be set forth expressly in the appended claims.

Refer to both FIG. 1 and FIG. 2. A post construction wall box assembly 100 according to the present invention is constructed from two major components, an enclosure 200 and a clenching bracket 300 which are joined together by a first joining screw 431 and a second joining screw 432. In further embodiments, additional joining screws may be employed. The enclosure 200, which may be generally rectangular in shape, includes a first set of parallel and opposed sidewalls 210 which are depicted as vertical sidewalls in FIG. 1. These sidewalls 210 further include exterior wall flanges 214, which may be formed, for example, by bending the ends of the sidewalls to right angles during fabrication.

The enclosure 200 also includes a second set of parallel and opposed sidewalls 220 that have alignment cutouts 225 and a back wall 230 which has a utility cutout, in one embodiment. These alignment cutouts 225 are provided to align portions of the clenching bracket 300 as described below. The back wall 230 includes a first hole 231 to accommodate the first joining screw 431 and a second hole 232 to accommodate the second joining screw 432.

The clenching bracket 300 includes a first slideable sidewall portion 310 that terminates in a first interior wall flange 314 and a second slideable sidewall portion 320 that terminates in a second interior wall flange 324. Both the first and second slideable sidewall portions (310, 320) are designed to compress up against the enclosure 200 during the installation of the clenching bracket 300 into a wall opening.

The first interior wall flange 314 is adapted to engage a first of said alignment cutouts. It will be obvious to those skilled in the art that both the first interior wall flange 314 and the first (set of) alignment cutouts 225 may comprise a plurality of individual portions. For example, in the embodiment shown, there are two individual portions.

The second interior wall flange 324 is adapted to engage a second of said alignment cutouts. It will be obvious to those skilled in the art that both the second interior wall flange 324 and the second (set of) alignment cutouts 225 may comprise a plurality of individual portions. For example, in the embodiment shown, there are two individual portions.

The clenching bracket 300 also includes a back wall portion 320 including a first threaded hole 331 and a second threaded hole 332. In one embodiment of the present invention, this back wall portion 320 further includes an associated utility cutout 335. The back wall portion 330 includes a first threaded hole 331 to accommodate the first joining screw 431 and a second threaded hole 332 to accommodate the second joining screw 432.

Advantageously, the interior wall flanges (314, 324) function using a ratcheting action in which they compress against the second set of parallel and opposed sidewalls as they are inserted through the wall opening and correspondingly expand behind the wall opening after they are inserted.

The present invention also contemplates a method for installing a residential low-voltage wall box into wall opening in a wall without requiring additional wall construction. For example, the wall opening may not be immediately adjacent to a stud or other firm mounting point behind the wall.

First, the clenching bracket is inserted into the opening, preferably as part of the overall wall mounting box assembly 100. As described previously, the clenching bracket includes a first slideable sidewall portion 310 which is terminated by a first interior wall flange 314. In one embodiment, the first interior wall flange is formed simply by bending an end of the first slideable sidewall portion 310 to form a compliant member. The second slideable sidewall portion 320 also terminates in a second interior wall flange 324, which may be formed in a similar manner.

During insertion, the first and second interior wall flanges (314, 324) are compressed such that they pass through the opening. For example, in one embodiment, each of these interior wall flanges forms a portion of a monolithic sidewall which is formed from a 'springy' material such as steel sheet metal. After insertion, the first and second interior wall flanges (314, 324) expand into a 'design position' such that they engage an interior surface of the wall.

Next, an enclosure 200 is inserted into the wall opening. Note that in a preferred embodiment, the enclosure 200 and the clenching bracket 300 are preassembled into an overall (wall box mounting) assembly 100 and this step is therefore an immediate continuation of the previous step of inserting the clenching bracket 300 into the wall opening. As described previously, the enclosure 200 includes a first set of parallel and opposed sidewalls 210 which have exterior wall flanges 214 thereupon. These exterior wall flanges 214 are adapted to engage an exterior surface of the wall, such as a wall built from gypsum board.

Finally, the clenching bracket 300 is joined with the enclosure 200. Advantageously, this joining action causing the exterior wall flange 214 and the interior wall flanges (314, 324) to cooperatively engage an edge of the wall. Is contemplated that different types of interior and exterior wall flanges will be developed in accordance with the present invention to accommodate various wall construction materials such as plywood and gypsum board.

INDUSTRIAL APPLICABILITY

To solve the aforementioned problems, the present invention is a unique system in which a clenching bracket is drawn up against a front box using joining screws and also thereby engages an edge of a wall board when these joining screws are tightened.

LIST OF ACRONYMS USED IN THE DETAILED DESCRIPTION OF THE INVENTION

The following is a list of the acronyms used in the specification in alphabetical order.

| UL | underwriters' laboratory |
|---|---|
| VDC | volts, direct current |

ALTERNATE EMBODIMENTS

Alternate embodiments may be devised without departing from the spirit or the scope of the invention. For example, the post construction wall box could be formed in a non-rectangular or other complex shape.

What is claimed is:

1. A post construction wall mounting box assembly (100) adapted to cooperatively engage an edge of a wall board, said assembly comprising:
   (a) an enclosure (200) further comprising
      (i) a first set of parallel and opposed sidewalls (210) having exterior wall flanges (214),
      (ii) a second set of parallel and opposed sidewalls (220) having alignment cutouts (225), and
      (iii) a back wall;
   (b) a clenching bracket (300) further comprising
      (i) a first slideable sidewall portion (310) terminating in a first interior wall flange (314) adapted to engage a first of said alignment cutouts,
      (ii) a second slideable sidewall portion (320) terminating in a second interior wall flange (324) adapted to engage a second of said alignment cutouts, and
      (iii) a back wall portion (320) including a first threaded hole (331) and a second threaded hole (332);
   (c) first and second joining screws (431, 432) adapted to engage said first and second threaded holes, respectfully; and
   (d) wherein said exterior wall flange and said interior wall flange are further adapted to cooperatively engage an edge of the wall board when said first and second joining screws are tightened.

2. The assembly of claim 1, further comprising additional joining screws.

3. The assembly of claim 1, wherein said enclosure is generally rectangular in shape.

4. The assembly of claim 1, wherein:
   (a) said back wall of the enclosure further comprises a utility cutout (235); and
   (b) said back wall portion of the clenching bracket further comprises an associated utility cutout (335).

5. The assembly of claim 1, wherein said enclosure is constructed from a material selected from the group consisting of steel, aluminum, and plastic.

6. The assembly of claim 1, wherein said clenching bracket is constructed from a material selected from the group consisting of steel, aluminum, and plastic.

7. A post construction wall mounting box assembly adapted to cooperatively engage an edge of a wall board, said assembly comprising:
   (a) a generally rectangular enclosure further comprising
      (i) a first set of parallel and opposed sidewalls having exterior wall flanges,
      (ii) a second set of parallel and opposed sidewalls having alignment cutouts, and
      (iii) a back wall further comprising a utility cutout;
   (b) a clenching bracket (300) fabricated from steel sheet metal and further comprising
      (i) a first slideable sidewall portion (310) terminating in a first interior wall flange (314) adapted to engage a first of said alignment cutouts,
      (ii) a second slideable sidewall portion (320) terminating in a second interior wall flange (324) adapted to engage a second of said alignment cutouts, and
      (iii) a back wall portion (330) including a first threaded hole, a second threaded hole, and an associated utility cutout;
   (c) first and second joining screws adapted to engage said first and second threaded holes, respectfully; and
   (d) wherein said exterior wall flange and said interior wall flange are further adapted to cooperatively engage an edge of the wall board when said first and second joining screws are tightened.

8. A method of installing a residential low-voltage wall box mounting assembly into an opening in a wall without requiring additional wall construction, said method comprising the steps of:
   (a) inserting a clenching bracket into the opening, said clenching bracket including a first slideable sidewall portion terminating in a first interior wall flange and a second slideable sidewall portion terminating in a second interior wall flange;
   (b) compressing said first and second interior wall flanges such that they pass through the opening;
   (c) inserting an enclosure into the opening, said enclosure including a first set of parallel and opposed sidewalls having exterior wall flanges thereupon which are adapted to engage an exterior surface of said wall and a second set of parallel and opposed sidewalls having alignment cut outs therein;
   (d) expanding said first and second interior wall flanges through said alignment cutouts such that they engage an interior surface of said wall; and
   (e) joining the clenching bracket with the enclosure whereby this joining action is adapted to cause the exterior wall flange and the interior wall flange to cooperatively engage an edge of said wall.

9. The method according to claim 8, wherein:
   (a) first slideable sidewall portion and said first interior wall flange form a first monolithic sidewall fabricated from a springy material; and
   (b) second slideable sidewall portion and said second interior wall flange form a second monolithic sidewall fabricated from a springy material.

10. The method according to claim 8, wherein said springy material is steel sheet metal:
   (a) first slideable sidewall portion and said first interior wall flange form a first monolithic sidewall; and (b) second slideable sidewall portion and said second interior wall flange form a second monolithic sidewall.

11. The method according to claim 8, wherein:
(a) the enclosure and the clenching bracket are preassembled into an overall wall box mounting assembly; and (b) the step of inserting said enclosure into the wall opening is an immediate continuation of the step of inserting said clenching bracket into the wall opening.

* * * * *